(12) United States Patent  
Nepustil

(10) Patent No.: US 6,463,458 B1  
(45) Date of Patent: Oct. 8, 2002

(54) INFORMATION SERVICE USING SINGLE-OBJECT SERVERS

(75) Inventor: Vladimir Nepustil, Boulder, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 1038 days.

(21) Appl. No.: 08/681,682

(22) Filed: Jul. 29, 1996

(51) Int. Cl.[7] .................................................. G06F 15/16
(52) U.S. Cl. ........................................ 709/203; 709/217
(58) Field of Search ........................ 395/200.33, 200.47

(56) References Cited

U.S. PATENT DOCUMENTS 5,737,619 A * 4/1998 Judson ........................ 395/761

OTHER PUBLICATIONS

Mark Brown, "Using Netscape 2, ".*
Que Corporation, 1995, pp. 773–786.*

* cited by examiner

Primary Examiner—Mehmet B. Geckil
(74) Attorney, Agent, or Firm—David Volejnicek

(57) ABSTRACT

An information network, such as the Internet (FIG. 1), uses a plurality of servers (140–142, 160, 170–171) each one of which serves only a single object (200–205), whereby the servers avoid the processing overhead involved in searching through files containing a plurality of objects for a requested object. Rather, receipt of a request by a server can only mean a request for the one object served by the server, which the server retrieves and provides to the requesting client (120). Since each server serves only one object, the client must contact a plurality of the servers in order to obtain a page (250) of information that comprises a plurality of objects.

6 Claims, 3 Drawing Sheets

INFORMATION SERVICE USING SINGLE-OBJECT SERVERS

TECHNICAL FIELD

This invention relates to information network architecture, such as the Internet or an intranet architecture.

BACKGROUND OF THE INVENTION

In an information network, such as the Internet, user's computers, referred to as clients, request information from information-providers' computers, referred to as servers, and the servers supply the requested information to the clients. In the World Wide Web (WWW), which is a de-facto standard for storing, finding, and transferring information on the Internet, the information is supplied in the form of pages. A page is a display screen-full of information expressed in textual, graphical, scriptural, and/or other format. A page comprises one or more information objects. An object is an information element that has its own network address—preferably a unique single address—, called a URL (Uniform Resource Locator). For example, a page may comprise one or more text objects, one or more picture objects, and one or more script objects that are presented on the display screen in a layout defined by a frame object.

Normally, a single server provides an entire page, and often a plurality of pages of related information. The information is normally requested by clients and provided by the server object-by-object. When it receives a request for information from a client, the server uses the address contained in the request to find and retrieve the addressed object from its files of objects and sends it to the client. The search for the requested object constitutes a significant processing overhead on the server's activities. A server can become swamped with requests for information. Under such a heavy load, the server typically gets bogged down with the searches for requested information, and its response time becomes slow.

To avoid overburdening a server, some service providers have the served information replicated in a plurality of servers and have different ones of the servers serve different requests, e.g., on a round-robin basis, thereby spreading the load of requests over multiple servers. However, this does nothing to lessen the processing overhead involved in searching for requested objects that each of the servers must perform.

SUMMARY OF THE INVENTION

This invention is directed to solving these and other problems and disadvantages of the prior art. According to the invention, an information network—the Internet, for example—uses a plurality of servers each one of which serves only a single object, so that a client must contact a plurality of servers in order to obtain a page of information that comprises a plurality of objects. Since each server serves only one object, it need not search for a requested object; rather, receipt of a request by the server can only mean a request for the one object, which the server retrieves and provides to the requester. Hence, the processing overhead involved in searching a plurality of objects for the requested object is eliminated. Because the server serves only the one simple function, the server can be a single, inexpensive, processor without much processing power. And because it stores and serves only the one object, the server's memory can be relatively small and hence inexpensive. Yet from the viewpoint of the client, the information network and the manner of obtaining information therefrom have not changed. Hence, no change in operation and no additional processing burden are imposed on the client. This results in a simplified information network, and one whose architecture can easily be retrofitted into existing information networks.

According to one aspect of the invention, an information system comprises a plurality of servers each one of which serves a different only one information object to clients, and a client of the servers which responds to a request from a user for a page that comprises a plurality of information objects by obtaining each information object of the page from a different one of the servers.

According to another aspect of the invention, a server for a client-server information system that includes a plurality of servers and at least one client of the servers, comprises memory for storing a single information object of a page that comprise a plurality of information object, and responds to the request from the client by providing only the single stored information object to the client; the server does not provide any other object to any clients. The client therefore must obtain the plurality of information objects of the page from a plurality of the servers, and preferably must obtain a different only one page from each one of the plurality of the servers.

According to a further aspect of the invention, a method of obtaining a page of information in an information system that includes a client and a plurality of servers of the client, comprises the following steps. In response to a user's request for a page that comprises a plurality of information objects, the client requests the plurality of information objects from the servers. And in response to the request, a plurality of the servers each provides a different only one of the requested information object to the client; none of the plurality of the servers provide any other information objects to any clients.

These and other advantages and features of the invention will become more apparent from the following description of an illustrative embodiment of the invention taken together with the drawing.

DETAILED DESCRIPTION

Figure 1:
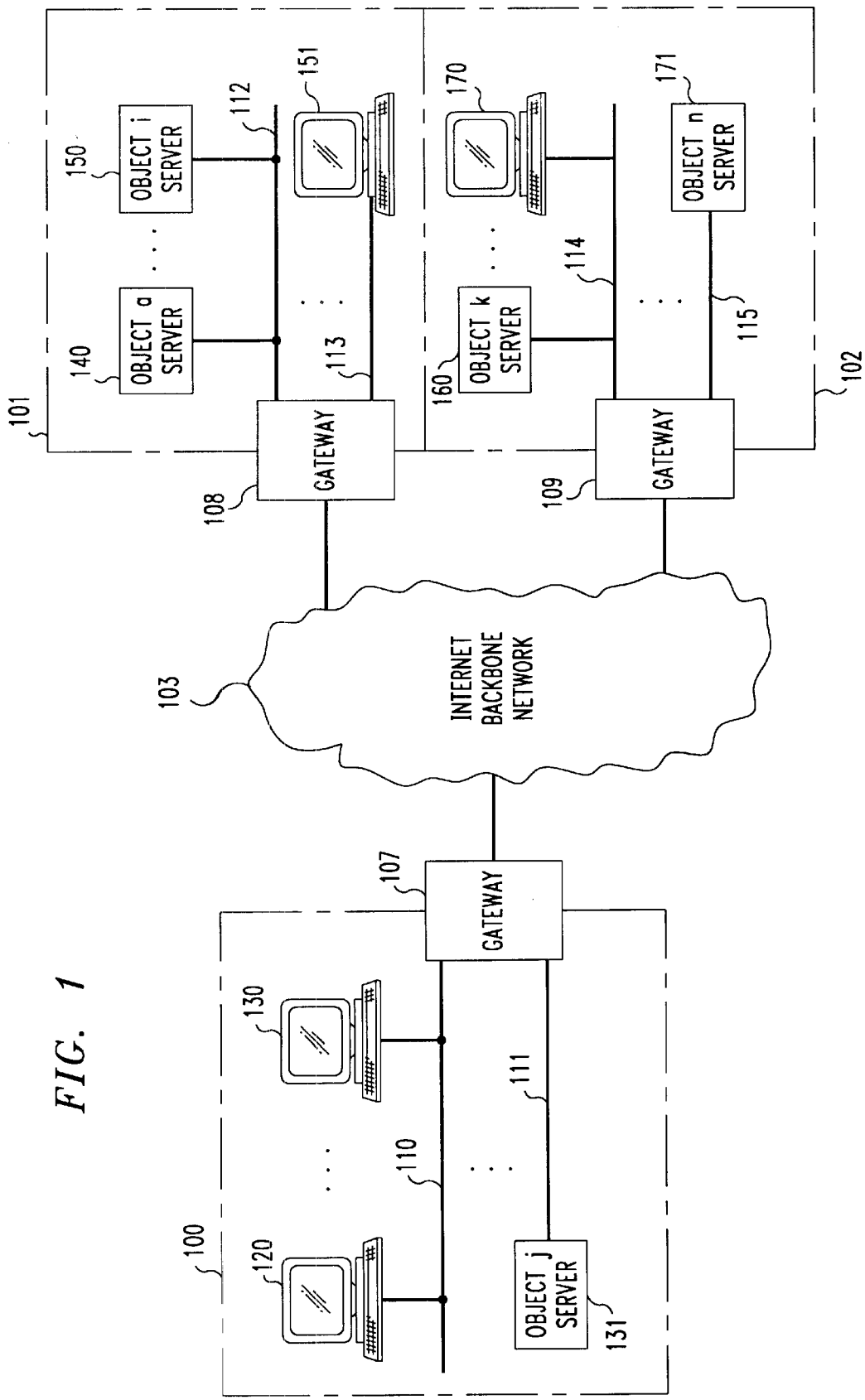
FIG. 1 is a block diagram of an information network that includes an illustrative embodiment of the invention.

FIG. 1 shows an illustrative information network, which in this example is the Internet. The Internet comprises a plurality of intranets 100–102 interconnected by an Internet backbone network 103. Access between each intranet 100–102 and the Internet backbone network 103 is provided by a gateway 107–109, respectively. Each intranet 100–102 comprises one or more local area networks (LANS) 110, 112, 114, respectively, and/or one or more communications links 111, 113, 115, respectively, each connecting one or more computers to the respective gateway. In the illustrative example of FIG. 1, LAN 110 connects a plurality of clients 120–130 to gateway 107 and link 111 connects a server 131 to gateway 107; LAN 112 connects a plurality of servers 140–150 to gateway 108 and link 113 connects a client 151 to gateway 108; and LAN 114 connects a mix of services and clients 160–170 to gateway 109 while link 115 connects a server 171 to gateway 109. As described so far, the Internet of FIG. 1 is conventional.

Figure 2:
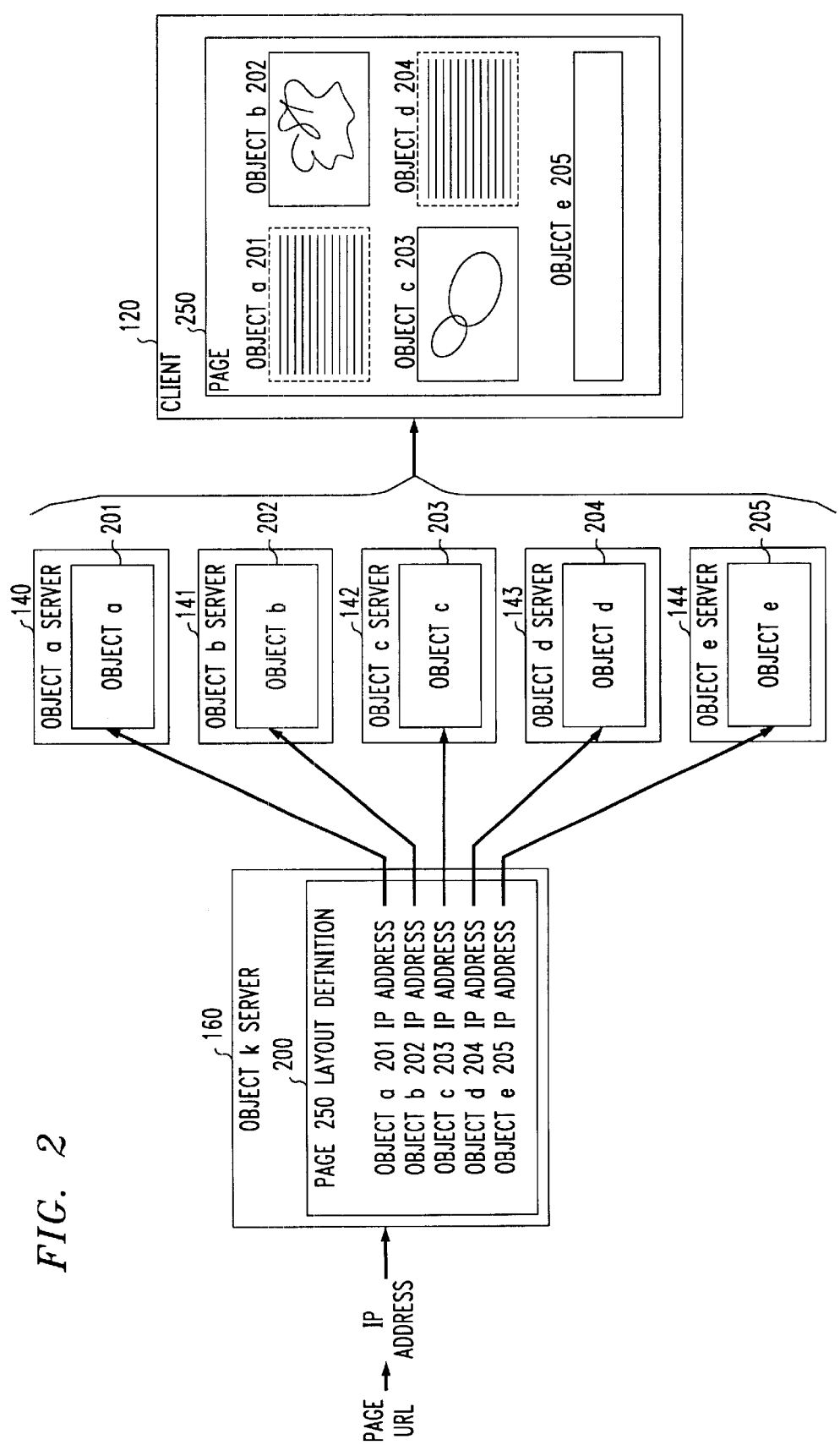
FIG. 2 is a block diagram illustrating how a page is obtained and composed in the network of FIG. 1.

According to the invention, at least some, and possibly all, of the servers 131, 140–150, 160, and 170–171 are single-object servers; each provides only one addressable information unit (i.e., one object) to requesting clients. This aspect of the Internet of FIG. 1 is illustrated more clearly in FIG. 2. As is conventional, a user of a client 120 who is in possession of a universal resource locator (URL)—a name, or a virtual address—of a page that the user wishes to view sends the host name part of the URL to an Internet name server—e.g., a gateway—which returns a corresponding Internet Protocol (IP) address—address of a particular computer. Client 120 then sends out the IP address as a page request on the Internet, and a server 160 that is addressed by the IP address receives the request.

Figure 3:
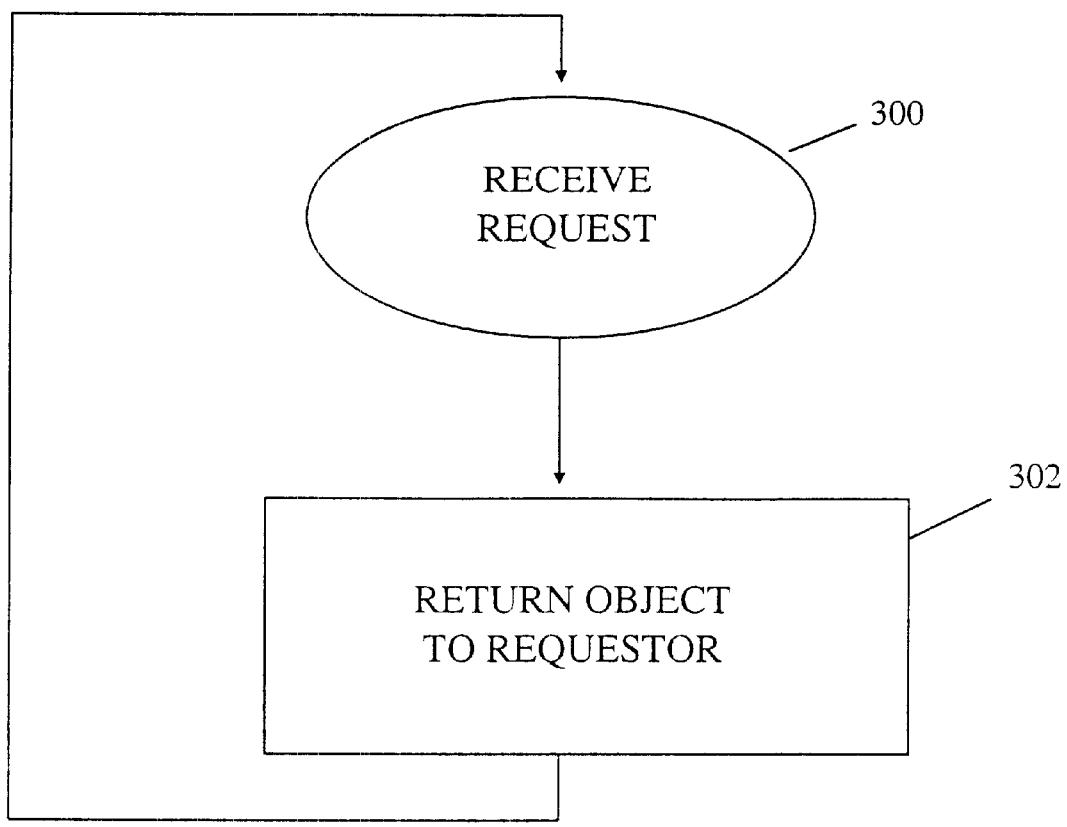
FIG. 3 is a flow diagram of operation of an object server of the network of FIG. 1.

According to the invention, server 160 is a single-object server. Hence, it need not search its files for the object that is addressed by the request, but merely responds to the receipt of the request at step 300 of FIG. 3, by returning to the requesting client 120 its one object 200 at step 302. Object 200 is the frame object of the desired page: it contains information that defines the page layout and the IP addresses of the text, graphic, script, etc., objects 201–205 that make up the page.

Upon receipt of object 200, client 120 sends out the IP addresses contained by object 200 as requests on the Internet, and servers addressed by these IP addresses receive the requests. Each IP address addresses a different server 140, 141, 142, 170, 171, and hence each request is received by a different one of those servers, which also are single-object servers. Hence, these servers also need not search their files for the requested objects. Rather, each server 140, 141, 142, 170, 171 responds to the request which it received at step 300 by returning its one object 201–205, respectively, to the requesting client 120 at step 302. Client 120 responds to receipt of the requested objects 201–205 by composing therefrom the desired page according to the layout definition contained in frame object 200 and displays the page to the user, in a conventional manner.

Of course, various changes and modifications to the illustrative embodiment described above will be apparent to those skilled in the art. For example, the single object servers may take any desirable form—from large computers to microprocessors embedded in other appliances (e.g., washing machines, toasters, etc.). Or, replicated single-object servers may be used along with round-robin DNS resolution to spread the load among servers. Also, a mixture of single-object and multiple-object servers may be used together in a network. Such changes and modifications can be made without departing from the spirit and the scope of the invention and without diminishing its attendant advantages. It is therefore intended that such changes and modifications be covered by the following claims.

The invention claimed is:

1. An information system comprising:

a plurality of servers each serving a different only one information object to clients; and a client of the servers connected to the plurality of servers and responsive to a request from a user for a page comprising a plurality of information objects, for obtaining each information object of the page from a different one of the servers.

2. The information system of claim 1 wherein:

the page comprises a plurality of data information objects configured in a manner defined by a frame information object; and each server serves only a single one of the frame and the data information objects.

3. The information system of claim 2 wherein:

the client configures the received plurality of data information objects into the requested page for the user in the manner defined by the frame information object.

4. A server for a client-server information system comprising a plurality of servers and at least one client of the servers, the server comprising:

means for storing a single information object of a page comprising a plurality of information objects; and means responsive to a request from the client, for providing only the single stored information object to the client without providing any other objects to any clients;

so that the client must obtain the plurality of information objects of the page from a plurality of the servers.

5. A method of obtaining a page of information in an information system comprising a client and a plurality of servers of the client, comprising the steps of:

in response to a user's request for a page comprising a plurality of information objects, the client requesting the plurality of information objects from the servers; and in response to the request, a plurality of the servers each providing a different only one of the requested information objects to the client without providing any other information objects to any clients.

6. The method of claim 5 wherein:

the step of requesting comprises the steps of in response to the user's request for the page comprising a plurality of data information objects, the client requesting a frame information object that identifies the plurality of data information objects, and in response to receiving the frame information object, the client requesting the plurality of data information objects identified by the frame information object; and the step of providing comprises the steps of in response to the request for the frame information object, a first server providing the frame information object to the client without providing any other objects to any clients, and in response to the request for the data information objects, a plurality of servers other than the first server each providing a different only one of the requested data information objects to the client without providing any other objects to any clients.

* * * * *